June 26, 1962 W. C. FICHTER, JR 3,041,608

TRANSMIT-RECEIVE SWITCHING CIRCUIT USING REVERSE BIASING FEEDBACK

Filed March 2, 1961 3 Sheets-Sheet 1

*INVENTOR.*
WALTER C. FICHTER, JR

*BY* [signature]

ATTORNEY

June 26, 1962 W. C. FICHTER, JR 3,041,608

TRANSMIT-RECEIVE SWITCHING CIRCUIT USING REVERSE BIASING FEEDBACK

Filed March 2, 1961 3 Sheets-Sheet 2

INVENTOR.
WALTER C. FICHTER, JR.

BY [signature]

ATTORNEY

INVENTOR.
WALTER C. FICHTER. JR.
BY [signature]
ATTORNEY

United States Patent Office 3,041,608

Patented June 26, 1962

3,041,608

TRANSMIT-RECEIVE SWITCHING CIRCUIT USING REVERSE BIASING FEEDBACK

Walter C. Fichter, Jr., 33 Myrtle Ave., Cedar Grove, N.J.

Filed Mar. 2, 1961, Ser. No. 92,950
9 Claims. (Cl. 343—180)

This invention relates to electrical systems and, more particularly, to a switch for use with systems which alternately transmit and receive radio signals.

The electronic method of switching the antenna, when changing between transmitting and receiving conditions, is advantageous over manual or relay switching for the following reasons:

(1) Fast switching action, which is especially desirable for code transmissions.

(2) Quiet operation.

(3) Freedom from maintenaance due to such as relay failure caused by burned contacts and the like.

Although advantageous for the reasons enumerated, existing commercial electronic transfer switches are not popular for the following reasons:

(1) Harmnoic signals are generated which interfere with television reception.

(2) A signal suck-out condition exists because the resonant point of the transmitter tank circuit acts as a trap. This condition weakens the desired received signal and causes random noise to be amplified, degrading the quality of the audio signal.

(3) High voltage arc-over and resultant damage to components occur if the transmitter output impedance is not reasonably matched to the antenna.

(4) Some power is consumed by the switching tube during transmission.

It is accordingly an object of my invention to provide an electronic antenna transfer switch which will not cause television interference and which will eliminate the signal suck-out condition.

Another object of my invention is to eliminate arc-over and the resultant damage if the transmitter output is not matched to the antenna input impedance.

A further object of my invention is to eliminate power consumption by the switching tube.

A still further object of my invention is to provide an electrical transmitting-receiving system using an electronic tube with a plurality of grids, means coupling a grid, other than the number one grid, to the antenna or resonant point of the transmitter tank circuit, and means coupling the plate of said tube to the receiver, whereby a signal received by the antenna is amplified by said tube and the output conducted to the receiver, and means insuring that the number one grid of said tube is positive under receiving conditions while biased negative to a cut-off condition under transmitting conditions.

These and other objects and advantages will become apparent from the following detailed description when taken with the accompanying drawings. It will be understood that the drawings are for purposes of illustration and do not define the scope or limits of the invention, reference being had for the latter purpose to the appended claims.

In the drawings, wherein like reference characters denote like parts in the several views.

Figure 2:
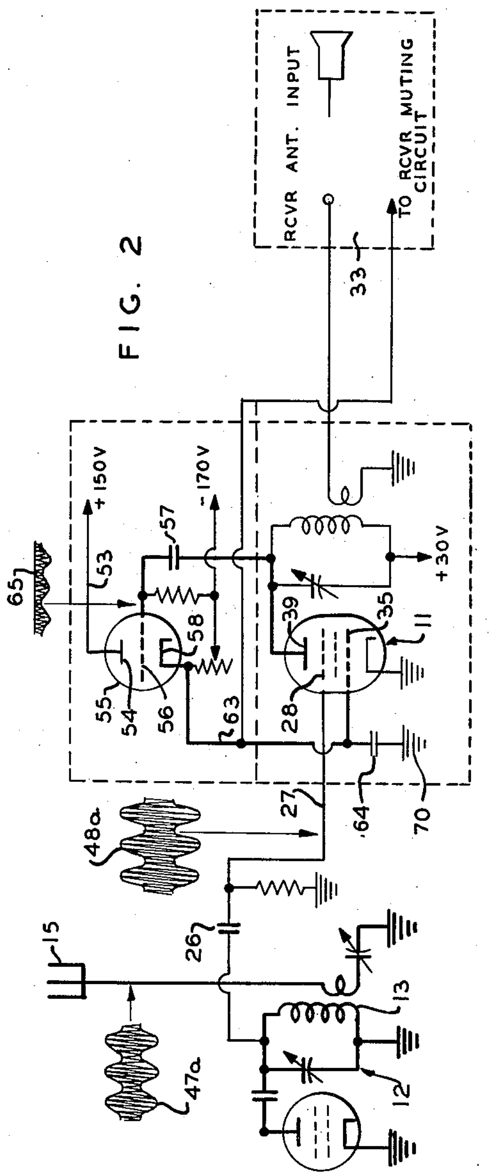
FIGURE 2 is a block diagram of the circuit of FIGURE 1, but showing how it operates under transmitting conditions.

Generally, my invention involves the connection and operation of an electronic radio tube as an antenna switching device, in such a manner as to couple the antenna signal to an electron tube grid, other than the number one grid. Under transmitting conditions, as represented in FIGURE 2, a negative voltage is developed on the number one grid which biases off the tube, thereby protecting the receiver.

Various versions of commercial electronic antenna switches for amateur radio use are in existence. Such switches develop protective bias by rectifying the transmitted signal voltage at the grid of a switching tube. It is this rectified voltage that produces harmonic signals which cause television interference.

In one existing form, the antenna transfer switch in the form of a three-electrode tube has its grid coupled through a condenser to the low impedance point of the transmitter tank circuit. The resonant point of the tank circuit acts as a trap, decreasing the level of the signal voltage coupled to the antenna transfer switch.

The voltage amplification of the antenna transfer switch makes up for loss of gain due to the signal suck-out condition, but the quality of the audio signal is degraded because of the lower signal-to-noise ratio of the amplified signal.

The transmitter output voltage is coupled to the number one grid, or the only grid, of the switching tube. This voltage is rectified between the grid and cathode, causing a negative voltage to develop at the grid. The negative voltage biases off the switching tube, preventing damage to the tube or other components by excessive conduction.

The rectified signal at the grid of the switching tube reacts with the transmitter output, causing harmonic signals to be radiated. These harmonic signals often fall within television frequencies and thus interfere with reception by receiving sets.

Because of the close spacing between the grid number one and its cathode in an electron tube, and because of high diode conduction due to rectification of the transmitter radio frequency voltage, the peak voltage input to existing antenna switches must be kept relatively low. For this reason the input to the switching tube is coupled to the low impedance section of the transmitter tank circuit, practically equivalent to connecting it directly to the antenna lead. The resonant section of the tank circuit acts as a trap under receiving conditions, absorbing the desired signal voltage from the input to the switching tube.

Figure 1:
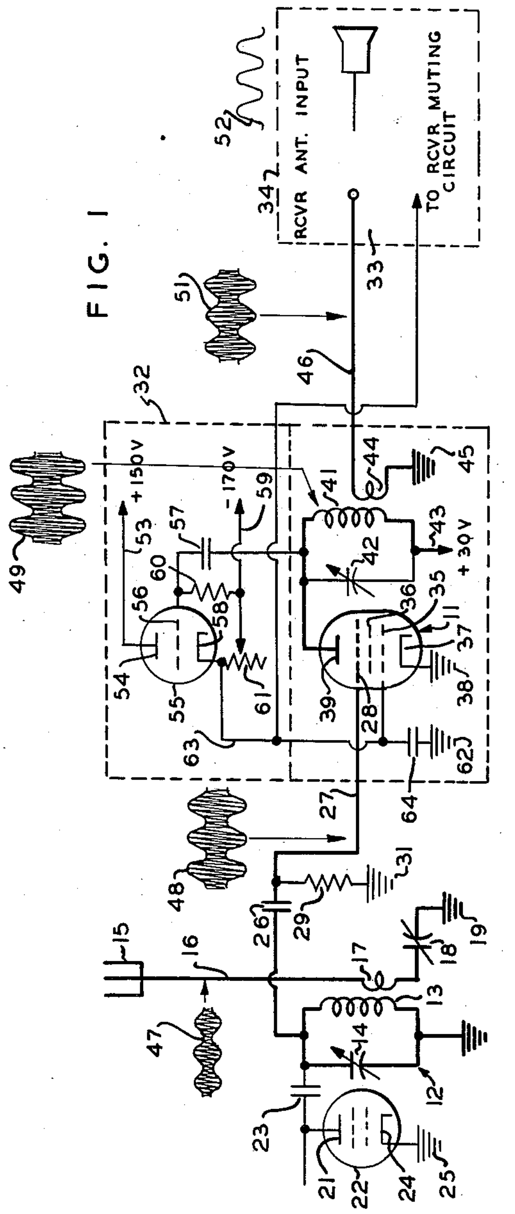
FIGURE 1 is a block diagram of a circuit embodying my invention and showing how it operates under receiving conditions.

Referring now to the drawings in detail and first considering FIGURE 1, there is shown a block diagram representing the operation under receiving conditions of an antenna switching tube 11 in a circuit embodying my invention. The switching tube 11 and associated components may be assembled as a small compact unit to facilitate mounting in or adjacent to the enclosure of the transmitter tank circuit, identified as 12. The circuit 12 comprises a coil 13 and a variable condenser 14. The antenna 15 is connected by its lead 16 and a coil 17 inductively to the coil 13 and from there the circuit passes through a variable condenser 18 to ground at 19. The tank circuit 12 is here shown connected to the plate 21 of a transmitting tube 22 through condenser 23, the cathode 24 of said tube being grounded at 25.

The increased signal voltage from the transmitter tank circuit 12 is amplified by connection, desirably from the resonant point of said circuit, through condenser 26 and lead 27 to a grid other than the number one grid, in this instance, the third grid 28 of the multi-grid tube 11, or one between the plate 39 and the number one grid 35. This lead 27 may be grounded through resistor 29 as indicated at 31. The tube 11 and associated apparatus is shown housed as a unit, indicated by the dotted line enclosure 32. The receiver 33 is shown separately housed, as indicated by the dotted line 34. The switching tube 11 is here shown as including, in addition to the third grid 28, a first grid 35 and a second grid 36, said second grid in the present embodiment being illustrated as idle. It will, therefore, be understood that it is not essential that a three-grid tube be employed, as one having only two grids may be here used and the signal directed to the second grid. The tube has a cathode 37 grounded as indicated at 38 and provided with a conventional heater element, not shown.

The output of the tube 11 is here directed from its plate 39 to a circuit consisting of a coil 41 and an adjustable condenser 42, and connected to a positive potential of about 30 volts as indicated at 43. This circuit is connected to the receiver antenna input by means of an inductively related coil 44. One end of said coil 44 is grounded at 45, the other end connected by lead 46 to the antenna input point of the receiver 33.

Thus, under receiving conditions, the signal, represented as a modulated carrier wave 47, is picked up by the resonant circuit 12 and carried, as a signal, represented at 48, increased in voltage by resonance, along the lead 27 to the third grid 28 of the tube 11. Said signal is amplified at the plate 39 to an increased voltage, represented by the modulated wave 49. It is picked up from the resonant circuit, produced by the coil 41 and condenser 42, by the inductively-related coil 44 and transmitted to the receiver 33 as a modulated wave represented at 51, becoming in the receiver an audio signal designated 52. The signal 52 is improved in quality because of the increase in the ratio of signal to noise contributed by the resonant circuit 12.

The operation of the tube 11 is effected by impressing a positive voltage, of say about 150, along the lead 53 to the plate 54 of a biasing electron tube 55, the single grid 56 of which is connected through a condenser 57 to the plate 39 of said tube 11 and through leak resistor 60 to the negative biasing lead 59 to cathode 58. The cathode 58 of the tube 55 has a negative potential, of say about 170, applied through said lead 59 and an adjustable resistor 61. It is by-passed to ground 62 through lead 63 and condenser 64. It is also connected through lead 63 to the first grid 35 of the tube 11, although in the operation of receiving, just described, it is only effective to establish a small positive potential on the grid 35, but not effective in negatively biasing the grid 35 to cut-off the tube 11 as under transmitting conditions.

Under transmitting conditions, with reference to FIGURE 2, the antenna signal is here represented as a modulated carrier wave 47*a*, increased in amplitude as compared with the signal 47, because it is a transmitted rather than a received wave. The signal from the here-selected resonant point of the tank circuit 12 is coupled through condenser 26 to the number three grid 28 of the switching tube 11 by lead 27, as in FIGURE 1. The signal is represented as a modulated carrier wave 48*a*, also increased in amplitude as compared with the wave 48 of FIGURE 1, because of the increase in signal strength.

However, rectification of this voltage in the switching tube 11 is under these conditions virtually eliminated because of the negative potential developed on the number one grid 35 by the biasing stage tube 55, connected as described in connection with FIGURE 1. Under the transmitting conditions of FIGURE 2, however, the tube 55 is not relatively inactive, insofar as its biasing effect on the number one grid 35 of the tube 11 is concerned, because of the increased strength of the signal impressed on the grid 28.

Thus, under transmitting conditions, a very low radio-frequency voltage exists at the plate 39 of the tube 11, because of coupling through the internal capacitance of said tube. This voltage is by condenser 57 coupled to the grid 56 of the tube 55, where it is rectified, as represented by the modulated carrier wave 65, biasing-off tube 55 and causing a negative voltage to develop through connection between the cathode 58 of said tube 55 by the lead 63 to grid number one 35 of the tube 11. This negative voltage effects a change in the normal potential of the number one grid 35 from about 1 volt to a negative potential sufficient to cut off the switching tube 11. The condenser 64 prevents radio-frequency voltage from developing on the number one grid 35, through the capacitance of said tube, by bypassing it to ground at 70 and is thus essential to the operation of the switching tube 11.

From the foregoing disclosure it will be seen that, by virtue of the employment of the biasing tube 55 in connection with the switching tube 11, said switching tube 11 has a positive potential applied to its number one grid 35, through the positive potential applied by the lead 53 to the plate 54 of said tube 55. This positive potential on the number one grid 35 is not nullified under receiving conditions, because of the weakness of the received signal on the number three grid 28. However, under transmitting conditions, the transmitted signal is so much stronger that, by virtue of the capacitance between the grid 28 and the plate 39, as above described, the potential of the number one grid 35 is changed from plus to minus, thereby cutting off the tube 11 and preventing the strong signal 48*a* from getting through and causing damage to the antenna switch 11 and the receiver 33.

Figure 3:
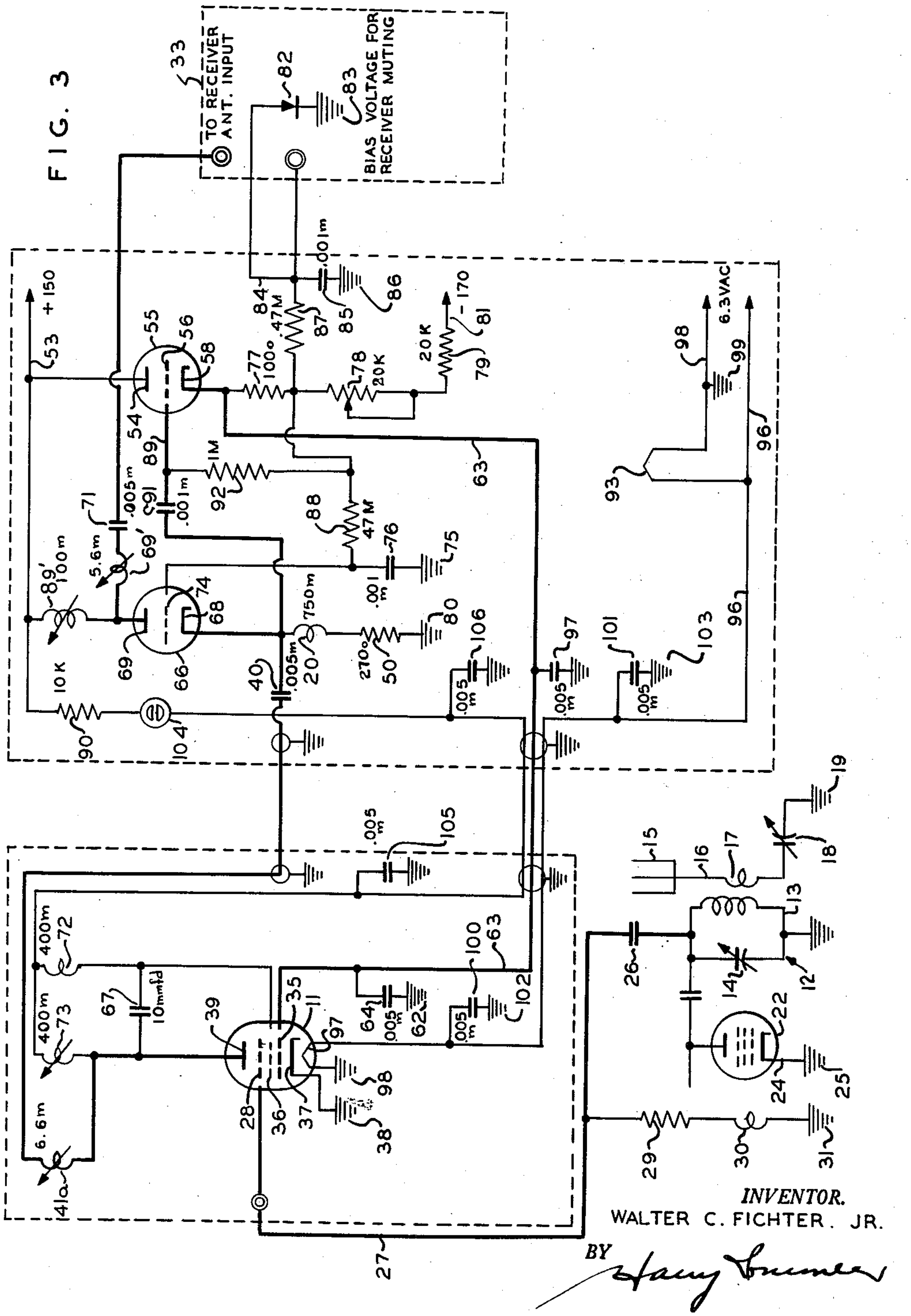
FIGURE 3 is a diagram of circuit embodying the invention principle of FIGURES 1 and 2, but including parts which contribute to make the circuit suitable for practical use.

Referring now to the embodiment of my invention illustrated in FIGURE 3, there is shown a circuit following generally that of FIGURES 1 and 2, except that among other features an amplifying tube 66 is included, which is desirably a portion of a dual-triode tube, say type 12AT7 with a common cathode heater 93, the completing portion being tube 55. I therefore designate the dual tube as 55—66. There are also other features desirably included for making a practical arrangement. The numbering of the parts is the same as that of FIGURES 1 and 2, insofar as there is correspondence therebetween.

In accordance with FIGURE 3, the resonant point of the transmitter tank circuit 12 under receiving conditions is coupled through condenser 26 and lead 27 to the number three grid 28 of the switching tube 11. The lead 27 may here be grounded through resistor 29 and coil 30 as indicated at 31. The tube 11 may be of the type 6AS6. The number two grid 36 of said tube, instead of being open-circuited, is here maintained at the same potential as the plate 39, which is connected to a positive source of about 30 volts, by connection thereto through coil 72, so that it acts as a virtual cathode. The gain of the circuit is considerably increased by operating the number one grid 35 at a positive potential of say about one volt. This potential is effected, as in the preceding embodiment, by connection with the cathode 58 of biasing tube 55, the plate 54 of which is connected to a positive potential of about 150 volts by lead 53. As in the preceding embodiment, the lead 63 from the cathode 58 is by-passed to ground at 62 through condenser 64.

Instead of connecting the plate 39 of the tube 11 directly to a coil 41 and from there to the receiver 33, it is, in the present instance, connected through an adjustable inductor or coil 41*a* and a condenser 40 to the cathode 68 of the amplifying tube 66 or portion of the dual triode 55—66. Said cathode 68 is connected through coil 20 and resistor 50 to ground indicated at 80. The plate 69 of said tube is connected to adjustable inductor or coil 69′ and coupled through condenser 71 to the receiver 33. It is also connected to adjustable inductor 89' and lead 53 to said source of positive potential of about 150 volts. The gain of the arrangement is increased by employing a coil 72 associated with the condenser 67 and an adjustable inductor or coil 73 to effectively lower the input capacitance, in which the condenser 67 provides a neutralizing capacitance to prevent oscillation.

The amplified output voltage from the plate 39 is developed across coil 73. The coil 41a is resonant with the circuit capacitance to match the input impedance of the amplifying tube 66, or portion of the dual tube 55—66, at the highest operating frequency. The tube or portion 66 is an amplifier, with a grid 74 grounded as to radio frequency at 75 through condenser 76 and with its output circuit adjusted to match the impedance at the radio receiver antenna input.

The positive potential existing on the number one grid 35 of the tube 11 is, as in the previous embodiment, developed because of the difference in potential between the positive voltage drop across the tube or portion 55 and the negative voltage drop across the resistor 77, the adjustable resistor 78, and the resistor 79, from the negative potential, in this instance about 170 volts, at the lead 81 to said resistor 79.

A diode 82, which may be one of type IN34A, is desirably provided to shunt positive voltage from the receiver muting supply, as to ground at 83. The latter is connected to a lead 84 and by-passed through a condenser 85 to ground at 86. It is also connected through a resistor 87 to the mid-point between resistors 77 and 78, and then to the lead between grid 74 and condenser 76 through resistor 88 and also the lead 89 between condenser 91 and the grid 56 of tube 55 through resistor 92. The condenser 91 is, in turn, connected to the cathode 68 of tube 66.

The common heater coil 93 for the cathodes 58 and 68 may be powered by a circuit from a source of alternating current at say 6.3 volts along lead 96. The return lead 98 is beyond the heater 93 grounded at 99. The heater 97 for the cathode 37 for the tube 11 may also be powered from the lead 96, the return being grounded at 98. Stray radio-frequency voltage is removed from the lead 96 by condensers such as 100 and 101, grounded respectively at 102 and 103, thereby preventing an undesired radiation of such voltage. The other grounded condensers 64, 97, 105 and 106 remove such voltage from their respective leads, only the first of these four being essential, as before explained, the five others above mentioned being precautionary for the specified purpose.

Because the tube 11 is here operated under non-conventional conditions, information as to typical but non-limiting current flow at the various elements is furnished as follows:

| | Milliamperes |
|---|---|
| Plate current | 2.5 |
| Number two grid current | 3.5 |
| Number one grid current | 1.2 |

Under transmitting conditions a very small percentage of the radio-frequency voltage is coupled through the number three grid 28 to the plate 39 by capacitance therebetween, which serves as an input to the grid 56 of the biasing tube or portion 55. This small amount of signal voltage is rectified between the grid 56 and cathode 58 of tube or portion 55, developing a negative potential at grid 56 causing a reduction in the plate current through said tube. This action reduces the positive voltage drop across tube 66 and causes the potential developed in the number one grid 35 of tube 11 to change from the initial positive value of about one volt to a negative value sufficient to completely bias off the tube 11 and its associated amplifying tube or part 66.

I desirably have a signal device, such as a neon glow lamp, 104, which is operative under receiving conditions but is completely extinguished during transmission. This is accomplished by virtue of the operation of the tube 11 under receiving conditions and its biasing off during transmission, thereby then eliminating current through the lamp 104 connected in series with the plate 39 and the grid 36 through coils 73 and 72 and resistor 90 to the plus 150 supply.

There is no interference to television reception by virtue of the elimination of the rectification of the radio-frequency voltage at the input to the switching tube 11. The biasing off of the amplifying tube or part 66 eliminates excessive radio-frequency voltage at the antenna input to the receiver 33. The negative voltage which biases off tubes 11 and 66 may also be used for receiver muting.

Figure 4:
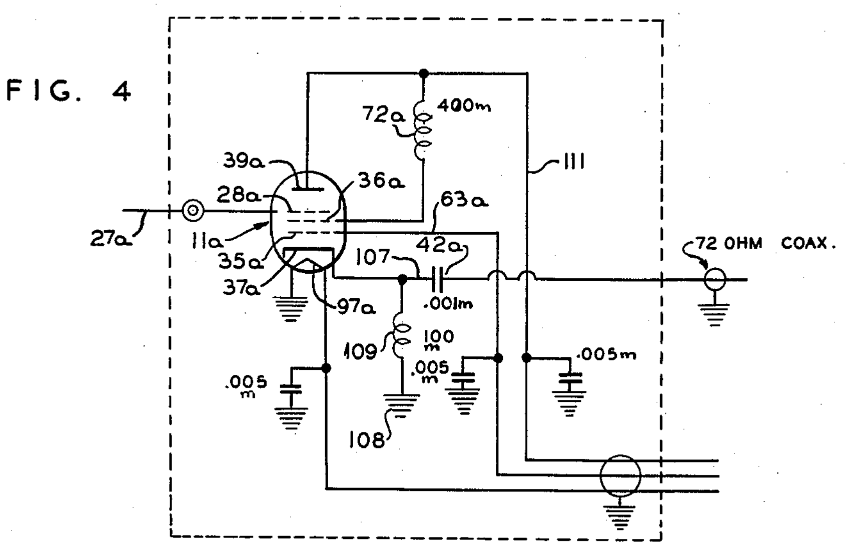
FIGURE 4 is a diagram of a portion of a circuit corresponding to FIGURE 3, but showing a modification.

Referring now to the embodiment of my invention illustrated in FIGURE 4, there is shown a fragmentary portion of a circuit, generally like that of FIGURE 3, with the following exception. The numbering of the parts is like that of FIGURE 3, insofar as there is correspondence, with the addition of distinguishing letter *a*. The output radio-frequency voltage is, however, here taken from the cathode **37*a* of the switching tube 11*a*, rather than from the plate 39*a* of said tube. This means that desirably the resonant point of the transmitter tank circuit (not shown) is coupled through a condenser (not shown) and fed to the number three grid 28*a* of said switching tube 11*a*, as along lead 27*a***.

The number two grid **36*a* of said tube is here maintained at the same potential as the plate 39*a*, as by connection thereto coil 72*a*, so that it acts as a virtual cathode. As in the embodiment of FIGURE 3, the gain of the circuit is considerably increased by operating the number one grid 35*a* at a positive potential of say about one volt. Such a potential may be obtained, as in the preceding embodiment, by connection with the cathode of the biasing tube (not shown) by means of lead 63*a***.

The cathode **37*a*, instead of being connected directly to ground (not shown) is in the present instance connected through condenser 42*a* to the cathode of the amplifying tube (not shown), as in the embodiment of FIGURE 3, as by means of lead 107. Said lead 107 is connected to ground at 108 through coil 109. The plate 39*a* of the tube 11*a*, in the present instance, is desirably connected by lead 111 through an indicator (not shown), such as the neon lamp 104 of the embodiment of FIGURE 3 and from there through a resistor (not shown) to the plus 150 supply (not shown) as in the preceding embodiment. The cathode heater 27*a*** may be energized from a low voltage alternating current source as in the preceding embodiment. Except as specifically described, the present embodiment may correspond with that of FIGURE 3.

Figure 5:
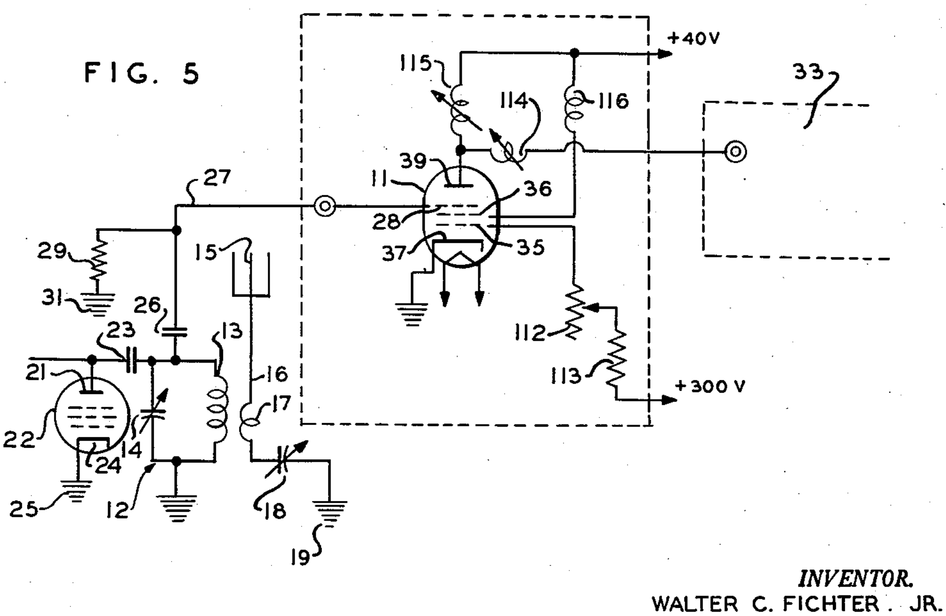
FIGURE 5 is a circuit corresponding to FIGURES 1 and 2 but showing the simplest practical arrangement embodying the invention.

Referring now to the embodiment of my invention illustrated in FIGURE 5, there is shown what I consider to be the simplest practical antenna switch arrangement which I now contemplate. As in the embodiment of FIGURE 1, I employ a plural grid antenna switching tube 11, the number three grid 28 of which is connected desirably to the resonant point of the transmitter tank circuit 12. The numbering of the parts is the same as that of FIGURE 3, insofar as there is correspondence. The circuit 12 comprises a coil 13 and a variable condenser 14. The antenna 15 is connected by its lead 16 and a coil 17, inductively to the coil 13 and from there the current passes through a variable condenser 18 to ground at 19. The tank circuit 12 is here shown connected to the plate 21 of the transmitting tube 22 through condenser 23, the cathode 24 of said tube being grounded at 25.

The increased signal voltage from the transmitter tank circuit 12 is, as in the preceding embodiments, amplified by connection through condenser 26 to, in this instance, the third grid 28 of the multi-grid switching tube 11. The lead 27 to said grid may be grounded through resistor 29 as indicated at 31. The switching tube 11 here includes a first grid 35 and a second grid 36. Here the switch 11 has the same advantages as the switch of FIGURE 3, except as follows:

(1) Although performance regarding radiation is improved as compared to existing antenna switches, the possibility of television interference is not completely eliminated.

(2) Elimination of the isolation stage of FIGURE 3 causes a higher level of radio-frequency voltage to exist at the antenna input to the receiver (not shown) during transmission.

The operation of the switch 11, in the present embodiment, is similar to that of the switch in FIGURE 3 except that the biasing voltage is developed by rectification of the radio-frequency voltage between grid number one, 35 and the cathode 37 of said tube 11. A very small percentage of the radio-frequency voltage applied to the number three grid is coupled through the tube's capacity to the number one grid where it is rectified, developing a negative voltage which partially biases off said tube 11. Initially the potential of the number one grid 35 is set at about one volt by adjusting the resistor 112 connected through resistor 113 to a positive poential of about 300 volts.

The plate 39 is connected through adjustable inductor or coil 114 to the receiver 33 and through adjustable inductor or coil 115 to a positive potential of about 40 volts. The number two grid 36 is connected through coil 116 to the same positive potential of about 40 volts. During reception this positive potential of about 1 volt is maintained on the number one grid. However during transmission it is, as above explained, changed to a negative potential to sufficiently bias off the tube 11 to protect the receiver against damage.

In all of the foregoing figures, the numerals disposed adjacent to the coils give the inductances of said coils in microhenries and the numerals adjacent the condensers give their capacitances in microfarads, except for the condenser 67 in which the capacity is given in micro-microfarads. The values of the resistors, where shown, are in ohms, except when the numerals are followed by K when they are in kilohms and when followed by M they are in megohms. It will, however, be understood that these values are suggestive rather than limiting.

TEST RESULTS WITH THE CIRCUIT ILLUSTRATED IN FIGURE 3

*Receiving Conditions*

Broad band output coils were chosen to provide maximum gain at the higher frequencies. The signal gain as indicated on a Collins type 75S1 receiver (signal strength meter) is as follows:

| Amateur band, meter: | Gain, db |
|---|---|
| 80 | 10 |
| 40 | 10 |
| 20 | 15 |
| 15 | 20 |
| 10 | 20 |

*Transmitting Conditions*

To illustrate the switching action, a tabulation is presented listing the radio-frequency and direct current voltage developed at various points of the antenna switch during transmission on the 80 meter band. At 24 watts (D.C. transmitter input) the radio-frequency voltage rectified by the biasing tube 55 is not high enough to start the switching action, so that the direct current voltage developed across the resistor 29 due to rectification is almost as high as the radio-frequency voltage across said resistor 29.

At this low power it is not likely that rectification will cause television interference. At 48 watts, the switching action has started so that for a peak ratio-frequency volage of 70 volts across the resistor 29, the direct current voltage due to rectification is only 12 volts. At 96 watts, although the peak radio-frequency voltage across the resistor 29 is 135 volts, there is no direct current voltage due to rectification. The switching tube biases off with less power at the higher frequencies because the output coils are designed for maximum gain at the high frequencies.

The antenna switch may be used with a class AB2 linear amplifier operated at the maximum amateur radio legal input of 1000 watts with 3000 volts D.C. on the plate of the transmitter output tube.

There is no television interference on a set operated in the same area as such an amateur transmitter operated at the maximum legal input. A conventional type antenna switch completely obscures the picture. The switching action is so fast that the TV set does not flicker during CW operation (amateur code transmission).

SWITCHING ACTION WITH OPERATION ON THE 80 METER BAND USING A LOW-POWER TRANSMITTER-OPERATED CLASS AB1

| D.C. Transmitter Input, Watts | RF Voltage Across Resistor 29 | D.C. Voltage Across Resistor 29 | D.C. Voltage Across Resistor 92 | D.C. Voltage at Grid No. One of Tube 11 |
|---|---|---|---|---|
| 24 | 28 | −22.0 | − .7 | − .4 |
| 48 | 70 | −12.0 | −2.2 | − 5.0 |
| 72 | 100 | − .7 | −3.2 | −18.0 |
| 96 | 135 | 0 | −4.0 | −22.0 |
| 120 | 170 | 0 | −4.8 | −26.0 |

On the 40 meter band tube 11 is biased off at 24 watts
On the 20 meter band tube 11 is biased off at 17 watts
On the 10 meter band tube 11 is biased off at 12 watts

Having now described the invention in detail in accordance with the requirements of the patent statutes, those skilled in this art will have no difficulty in making changes and modifications in the individual parts or their relative assembly in order to meet specific requirements or conditions. Such changes and modifications may be made without departing from the scope and spirit of the invention, as set forth in the following claims.

I claim:

1. An electrical system for automatically switching, radio apparatus including an antenna and a receiver, between transmitting and receiving conditions, comprising an electron tube with a plurality of grids, means coupling a grid positioned between the number one grid and the plate of said tube, to the antenna and means coupling said plate to said receiver, whereby a signal received by said antenna is amplified by said tube and conducted to said receiver, and means insuring that the number one grid of said tube is positive under receiving conditions and biased negative to cut-off under transmitting conditions.

2. An electrical system for automatically switching, radio apparatus including an antenna, a transmitter tank circuit and a receiver, between transmitting and receiving conditions, comprising an electron tube with a plurality of grids, means coupling a grid positioned between the number one grid and the plate of said tube, to the transmitter tank circuit and means coupling said plate to said receiver, whereby a signal received by said antenna is amplified by said tube and conducted to said receiver, and means insuring that the number one grid is positive under receiving conditions and biased negative to cut-off under transmitting conditions.

3. An electrical system for automatically switching, radio apparatus including an antenna, a transmitter tank circuit and a receiver, between transmitting and receiving conditions, comprising an electron tube with a plurality of grids, means coupling a grid, positioned between the number one grid and the plate of said tube, to the transmitter tank circuit and means coupling said plate to said receiver, whereby a signal received by said antenna is amplified by said tube and conducted to said receiver, another electron tube with one grid, means applying a positive potential to the plate of said other tube, means connecting the cathode of said other tube through a resistor to a negative potential, means connecting the cathode of said other tube to the number one grid of said first-mentioned tube in order to bias it to cut-off under transmitting conditions, and means coupling the plate of said first-mentioned tube to the grid of said other tube to condition the latter for effecting such cut-off.

4. An electrical system for automatically switching, radio apparatus including an antenna, a transmitter tank circuit and a receiver, between transmitting and receiving conditions, comprising an electron tube with a plurality of grids, means coupling a grid positioned between the number one grid and the plate of said tube, to the resonant point of the transmitter tank circuit and means coupling said plate to said receiver, whereby a signal received by said antenna is amplified by said tube and conducted to said receiver, and means connecting the number one grid of said tube to a source of small positive potential so that said tube is operative during receiving conditions, the capacitance thereof with respect to said first-mentioned grid coupling the radio-frequency voltage to the number one grid, serving to rectify the radio-frequency voltage between the number one grid and cathode during transmitting conditions in order to bias it negatively to a condition of cut-off.

5. An electrical system for automatically switching, radio apparatus including an antenna, a transmitter tank circuit and a receiver, between transmitting and receiving conditions, comprising an electron tube with a plurality of grids, means coupling a grid, positioned between the number one grid and the plate of said tube, to the transmitter tank circuit, means coupling said cathode to said receiver, whereby a signal received by said antenna is conducted through said tube to said receiver, another electron tube with one grid, means applying positive potential on the plate of said other tube, means connecting the cathode of said other tube through a resistor to a negative potential, means connecting the cathode of said other tube to the number one grid of said first-mentioned tube in order to bias it to cut-off under transmitting conditions, and means coupling the cathode of said first-mentioned tube to the grid of said other tube to condition the latter for effecting such cut-off.

6. An electrical system for automatically switching, radio apparatus including an antenna, a transmitter tank circuit and a receiver, between transmitting and receiving conditions, comprising an electron tube with a plurality of grids, an amplifying tube, means coupling a grid, positioned between the number one grid and the plate of said electron tube, to the transmitter tank circuit, means coupling said plate to the cathode of said amplifying tube, means connecting the plate of said amplifying tube to said receiver, whereby a signal received by said antenna is conducted through said electron tube and said amplifying tube to said receiver, another electron tube with one grid, means applying positive potential on the plate of said other tube, means connecting the cathode of said other tube through a resistor to a negative potential, means connecting the cathode of said other tube to the number one grid of said first-mentioned tube in order to bias it to cut-off under transmitting conditions, and means coupling the plate of said first-mentioned tube to the grid of said other tube to condition the latter for effecting such cut-off.

7. An electrical system as recited in claim 6, wherein there is an indicator lamp in a circuit between the plate of the first-mentioned electron tube and the plate voltage supply of said tube to glow and give an indication of when the system is in receiving condition and be extinguished under transmitting conditions.

8. An electrical system for automatically switching, radio apparatus including an antenna, a transmitter tank circuit and a receiver, between transmitting and receiving conditions, comprising an electron tube with a plurality of grids, an amplifying tube, means coupling a grid, positioned between the number one grid and the plate of said electron tube, to the transmitter tank circuit, means coupling said cathode to the cathode of said amplifying tube, means connecting the plate of said amplifying tube to said receiver, whereby a signal received by said antenna is conducted through said electron tube and said amplifying tube to said receiver, another electron tube with one grid, means applying positive potential on the plate of said other tube, means connecting the cathode of said other tube through a resistor to a negative potential, means connecting the cathode of said other tube to the number one grid of said first-mentioned tube in order to bias it to cut-off under transmitting conditions, and means coupling the cathode of said first-mentioned tube to the grid of said other tube to condition the latter for effecting such cut-off.

9. An electrical system as recited in claim 8, wherein there is an indicator lamp in a circuit between the plate of the first-mentioned electron tube and the plate voltage supply of said tube to glow and give an indication of when the system is in receiving condition and be extinguished under transmitting conditions.

References Cited in the file of this patent

UNITED STATES PATENTS

| | | |
|---|---|---|
| 2,886,812 | Morgan | May 12, 1959 |
| 2,924,704 | Horowitz et al. | Feb. 9, 1960 |

FOREIGN PATENTS

| | | |
|---|---|---|
| 576,253 | Canada | Dec. 9, 1958 |